(12) United States Patent
Mutter et al.

(10) Patent No.: US 11,762,784 B2
(45) Date of Patent: Sep. 19, 2023

(54) USER STATION FOR A BUS SYSTEM AND METHOD FOR TRANSMITTING A MESSAGE AT DIFFERENT BIT RATES IN A BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH

(*) Notice: Subject to any disclaimer, the term of this patent is extended or adjusted under 35 U.S.C. 154(b) by 139 days.

(21) Appl. No.: 17/426,406

(22) PCT Filed: Jan. 23, 2020

(86) PCT No.: PCT/EP2020/051614
§ 371 (c)(1),
(2) Date: Jul. 28, 2021

(87) PCT Pub. No.: WO2020/156919
PCT Pub. Date: Aug. 6, 2020

(65) Prior Publication Data
US 2022/0107903 A1    Apr. 7, 2022

(30) Foreign Application Priority Data
Feb. 1, 2019 (DE) .......................... 102019201315.5

(51) Int. Cl.
*G06F 13/16* (2006.01)
*G06F 13/40* (2006.01)

(52) U.S. Cl.
CPC ...... *G06F 13/1605* (2013.01); *G06F 13/1689* (2013.01); *G06F 13/4022* (2013.01)

(58) Field of Classification Search
CPC ............. G06F 13/1605; G06F 13/1689; G06F 13/4022
See application file for complete search history.

(56) References Cited

U.S. PATENT DOCUMENTS

| 10,020,958 B2 * | 7/2018 | Lieder ............... H04L 12/40032 |
| 2013/0294540 A1 * | 11/2013 | Hell ..................... H04L 25/0298 |
| | | 375/295 |

(Continued)

FOREIGN PATENT DOCUMENTS

CN      102484694 A      5/2012

OTHER PUBLICATIONS

International Search Report for PCT/EP2020/051614, dated Mar. 3, 2020.

(Continued)

*Primary Examiner* — Eric T Oberly
(74) *Attorney, Agent, or Firm* — NORTON ROSE FULBRIGHT US LLP; Gerard Messina (57) ABSTRACT

A user station for a bus system and a method for transmitting a message at different bit rates in a bus system. The user station includes a communication control unit for creating a message for a further user station of the bus system. The communication control unit provides, in the message, a first phase, which is to be transmitted at a first bit rate, and to provide a second phase, which is to be transmitted at a second bit rate, which is faster than the first bit rate. The communication control unit is designed to provide in the message a first predetermined bit pattern for a bit rate switching between the first and second bit rate and to provide a second predetermined bit pattern for a bit rate switching between the second and first bit rate. The second predetermined pattern differs from all other bit patterns in a valid message.

13 Claims, 3 Drawing Sheets

(56) References Cited

U.S. PATENT DOCUMENTS

2016/0286010 A1    9/2016  Lennartsson
2017/0262394 A1*   9/2017  De Haas ........... H04L 12/40032
2018/0175958 A1*   6/2018  Fredriksson .......... H04J 3/0658

OTHER PUBLICATIONS

Lennartsson, "Comparing CAN FD With Classical CAN," Kvaser, 2016, pp. 1-8. <https://www.kvaser.com/wp-content/uploads/2016/10/comparing-can-fd-with-classical-can.pdf> Downloaded Jul. 21, 2021.
ISO 11898-1:2015 Road Vehicles—Controller area network (CAN)—Part 1: Data Link Layer and Physical Signalling. 74 Pages.
ISO 11898-2:2016 Road Vehicles—Controller Area Network (CAN)—Part 2: High-Speed Medium Access Unit. 40 Pages.

\* cited by examiner

USER STATION FOR A BUS SYSTEM AND METHOD FOR TRANSMITTING A MESSAGE AT DIFFERENT BIT RATES IN A BUS SYSTEM

FIELD

The present invention relates to a user station for a bus system and a method for transmitting a message at different bit rates in a bus system.

BACKGROUND INFORMATION

A bus system is often used for communication between sensors and control units, for example in vehicles, in which data are transmitted as messages in the standard ISO 11898-1:2015 as the CAN protocol specification with CAN FD. The messages are transmitted between the bus users of the bus system, such as sensor, control unit, encoder, etc.

In a classical CAN message format, the bit rate is restricted in that a bit arbitration at the beginning of a frame or a message and the acknowledgment at the end of a frame or a message is only possible if the bit time is significantly more than twice as long as the signal propagation time between two arbitrary bus users. In the arbitration, it is determined which of the bus users next has exclusive access to the bus of the bus system for a predetermined time. It is communicated by the acknowledgement whether or not a receiver has discovered an error in the received frame or message.

To nonetheless be able to transmit data at a higher bit rate, an option for switching to a higher bit rate within a message was created in the CAN FD message format. In such methods, the maximum possible data rate is increased above a value of 1 Mbit/s by using a higher clocking in the range of the data fields. Such messages are also referred to hereinafter as CAN FD frames or CAN FD messages. In CAN FD, the useful data length is increased from 8 to up to 64 bytes and the data transmission rates are significantly higher than in CAN.

The switching within a message in the FD frame format or FD message format to a higher bit rate and back takes place between the end of the arbitration and prior to the acknowledgement, as defined in the mentioned CAN protocol (ISO 11898-1:2015). In this range, the lower limit for the bit time is no longer determined by the single propagation times, but the bit time still has to offer sufficient reserves for possible asymmetries in the analog signal transmission and for phase shifts between the bus users caused by clock tolerances.

These phase shifts are compensated for in the CAN frame by regular synchronizations at edges from the recessive to the dominant bus level. A differentiation is made here between a hard synchronization and a resynchronization.

In the classical CAN frame, the hard synchronization takes place only once at the beginning of the frame or the message. A possible phase error is compensated for here up to a remainder of at most one time quantum. The time quantum is the time unit of the CAN protocol. In the case of the resynchronization, a residual error remains if the phase error was greater than configured synchronization jump width SJW. Synchronization jump width SJW indicates by how much the phase errors per synchronization procedure at most may be corrected. Synchronization jump width SJW therefore has to be at least as large as the phase error accumulated between two synchronizations may become. At a clock tolerance of df, the maximum clock difference between sender and receiver is 2*df. This means the phase error between the two bus users, which are also referred to as user stations of the bus system, may accumulate in 10 bit times (the maximum interval between two re-synchronizations) at, for example, df=1%, to 20% of a bit time.

The changeover from the slow to the faster bit rate in the CAN FD message takes place in two steps. Different synchronization rules apply during the arbitration, so that one bus subscriber which first loses the arbitration during the last bit of the identifier is possibly not sufficiently synchronized to the remaining sender.

Therefore, all receivers synchronize to the sender of the message with the aid of a hard synchronization at the edge from the recessive FDF bit of the CAN FD message to the following dominant reserved bit of the CAN FD message. Then comes the BRS bit, whose level decides whether the bit rate is switched. The switching time is at the sample point of this bit.

The described method requires that the clocks and configuration settings of all bus users are matched with one another enough that the sample point of all bus users is at the same position within the bit time. The hard synchronization at the end of the FDF bit restricts the deviations of the switching time between the bus users to the residual error after the hard synchronization. In relation to the bit time, this phase error becomes more severe after changing to the higher bit rate having the then shorter bit time. The first resynchronization after the switch takes place at the ESI bit or at the data length code, depending on the transmitted values. A deviating setting of the sample point position in a bus subscriber would increase the phase error at the switching time and leave less reserves available to compensate for clock tolerances.

With this type of the bit rate switching, the demand on the tolerance of the clock increases drastically with the bit rate ratio between faster and slower bit rate (bit rate of the data phase and bit rate of the arbitration phase). This is disadvantageous for the least complex bus protocol possible.

In the case of the switch from the faster bit rate back to the slower bit rate, the conveyed phase error is less important in relation to the then longer bit time. This change is therefore more robust than the switch from the slower bit rate to the faster bit rate.

SUMMARY

It is an object of the present invention to provide a user station for a bus system and a method for transmitting a message at different bit rates in a bus system which solve the above-mentioned problems. In particular, a user station for a bus system and a method for transmitting a message at different bit rates in a bus system are to be provided, in which even at a high bit rate ratio between faster and slower bit rate (bit rate of the data phase and bit rate of the arbitration phase), a high tolerance of the clock is given in a noncomplex and robust manner.

The object may be achieved by a user station for a bus system in accordance with an example embodiment of the present invention. In accordance with an example embodiment of the present invention, the user station includes a communication control unit to create a message for at least one further user station of the bus system, in which an exclusive, collision-free access of a user station to a bus line of the bus system is ensured at least temporarily, the communication control unit being designed to provide in the message a first phase, which is to be transmitted at a first bit rate, and to provide a second phase, which is to be transmitted at a second bit rate, which is faster than the first bit rate, the communication control unit being designed to provide in the message a first predetermined bit pattern for a bit rate switch between the first and second bit rate and to provide a second predetermined bit pattern for a bit rate switch between the second and first bit rate, and the second predetermined bit pattern differing from all other bit patterns in a valid message.

Using the user station, a bit rate switch is possible in which a synchronization takes place prior of and after the switching time. Using the fixed bit patterns used at the switching times, a better synchronization of the user station with other user stations of the bus system may be carried out in the bus system, before the variable useful data are transmitted. The fixed bit patterns at the switching times could be used, in addition to synchronizing the user stations, also to avoid failures when switching the operating mode of a transceiver unit (transceiver) from a first physical layer to a second physical layer or vice versa.

A further advantage is a greater robustness of the bit rate and transceiver switching even if an even higher bit rate ratio exists between arbitration and data phase than in the case of CAN FD.

In addition thereto, the user station offers the possibility, with the fixed bit patterns used at the switching times, of the reintegration of user stations of the bus system after reception errors, which have taken place, for example, because of an incorrect decoding of a reception signal received by the bus.

Due to the multiple synchronization, namely prior to and after the switching time, greater clock tolerances and more freedoms are permitted in the configuration settings.

In accordance with an example embodiment of the present invention, the method carried out by the user station may subsequently be incorporated into the CAN FD protocol or another CAN-based protocol. For example, the incorporation is also possible as an option, which is included optionally.

Advantageous further example embodiments of the user station are disclosed herein.

According to one special embodiment variant of the present invention, the second predetermined bit pattern includes at least two directly successive dominant bits of an arbitration phase as the first phase, wherein the at least two directly successive dominant bits, taken together, differ unambiguously from all bit sequences which may occur in a data phase as the second phase.

According to another special embodiment variant of the present invention, the first predetermined bit pattern has an edge for synchronization both prior to and also after the bit rate switch, with the aid of which the at least one further user station as the receiver may synchronize with the user station as the sender.

It is possible that the second predetermined bit pattern has an edge for synchronization at least after the bit rate switch and prior to the operating mode switch, with the aid of which the at least one further user station as the receiver may synchronize with the user station as the sender.

In accordance with an example embodiment of the present invention, the communication control unit may moreover be designed to provide a time for an operating mode switch in the first and second predetermined bit pattern, the time for an operating mode switch in the first predetermined bit pattern being after the time for the bit rate switch and prior to the edge for synchronization, which is provided after the bit rate switch for synchronization.

In one exemplary embodiment of the present invention, the edges for synchronization are edges from recessive to dominant.

According to another exemplary embodiment of the present invention, the communication control unit may be designed, after detection of an error, to search for the second predetermined bit pattern and a third predetermined bit pattern in the message, which indicates the end of the message, the communication control unit being designed to reintegrate in the communication in the bus system when the communication control unit has detected the second predetermined bit pattern or the third predetermined bit pattern.

It is possible that the message is a CAN FD message, in which the first predetermined bit pattern contains a switch of the first bit rate after an arbitration phase to a faster second bit rate in the data phase, in which useful data of the message are encompassed, and in which the second predetermined bit pattern includes a switch of the second bit rate to the slower first bit rate for the arbitration phase, prior to an acknowledgment.

The predetermined bit pattern possibly includes the FXF bit of a CAN FD message as a recessive bit, at which the first synchronization edge is provided.

The above-described user station may moreover include a transceiver unit for synchronization to at least one synchronization edge in the first and second predetermined bit pattern of a message at the end or beginning of a data phase. The transceiver unit is possibly designed here to switch its operating mode with the aid of the first and second predetermined bit pattern, in order to transmit the data at the second bit rate at a different bus level on the bus line than the data at the first bit rate.

The above-described user station may be part of a bus system which moreover includes a bus line and at least two user stations which are connected to one another via the bus line in such a way that they may communicate with one another. In this case, at least one of the at least two user stations is an above-described user station.

The above-mentioned object may moreover be achieved by a method for transmitting a message at different bit rates in a bus system in accordance with an example embodiment of the present invention. In accordance with an example embodiment of the present invention, the method has the step: creating, using a communication control unit of a user station of the bus system, a message for at least one further user station of the bus system, in which an exclusive, collision-free access of a user station to a bus line of the bus system is ensured at least temporarily, the communication control unit, providing in the message a first phase which is to be transmitted at a first bit rate, and providing a second phase, which is to be transmitted at a second bit rate which is faster than the first bit rate, the communication control unit providing in the message a first predetermined bit pattern for a bit rate switch between the first and second bit rate and providing a second predetermined bit pattern for a bit rate switch between the second and first bit rate, and the second predetermined bit pattern differing from all other bit patterns in a valid message.

The method offers the same advantages as were mentioned above with reference to the user station.

Further possible implementations of the present invention also include combinations which were not explicitly mentioned of features or embodiments described above or hereinafter with respect to the exemplary embodiments. Those skilled in the art will also add individual aspects as improvements or additions to the particular basic form of the present invention, in view of the disclosure herein.

BRIEF DESCRIPTION OF THE DRAWINGS

The present invention is described in more detail hereinafter with reference to the figures and on the basis of exemplary embodiments.

In the figures, identical or functionally identical elements are provided with the same reference numerals if not indicated otherwise.

DETAILED DESCRIPTION OF EXAMPLE EMBODIMENTS

Figure 1:
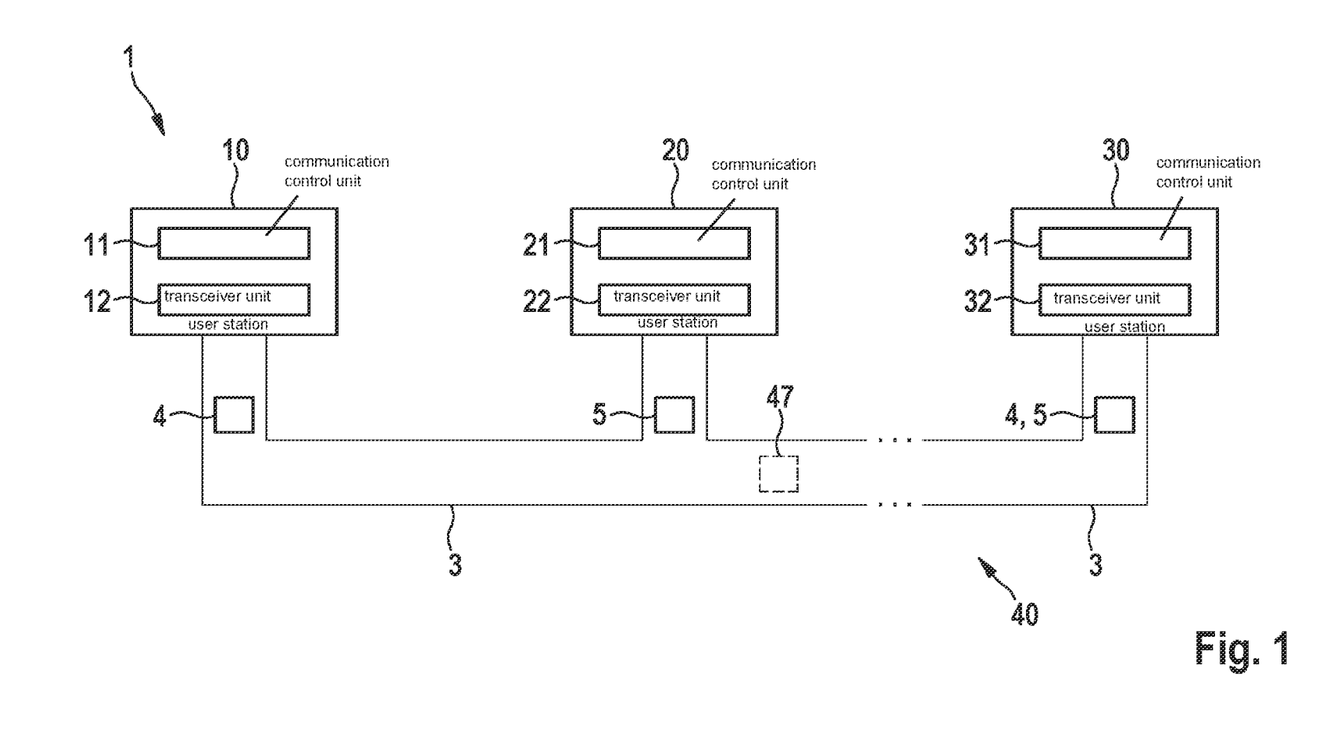
FIG. 1 shows a simplified block diagram of a bus system according to a first exemplary embodiment of the present invention.

FIG. 1 shows as an example a bus system 1, which is designed in particular for a CAN bus system, a CAN FD bus system, etc. Bus system 1 may be used in a vehicle, in particular a motor vehicle, an aircraft, etc., or in a hospital, etc.

In FIG. 1, bus system 1 includes a bus line, which is in particular a twisted two-wire line, and to which a plurality of user stations 10, 20, 30 are connected. Messages 4, 5 are serially transmittable via bus line 3 in the form of signals between individual user stations 10, 20, 30. User stations 10, 20, 30 are, for example, control units, sensors, display devices, etc. of a motor vehicle. If an error is detected by one of user stations 10, 20, 30 in a received message 4, 5, this user station may transmit an error identification (error flag) or error frame 47 on bus line 3, to communicate this to other user stations 10, 20, 30.

As shown in FIG. 1, user station 10 includes a communication control unit 11 and a transceiver unit 12. In contrast, user station 20 includes a communication control unit 21 and a transceiver unit 22. User station 30 includes a communication control unit 31 and a transceiver unit 32. Transceiver units 12, 22, 32 of user stations 10, 20, 30 are each connected directly to bus line 3, even if not shown in FIG. 1.

Communication control units 11, 21, 31 are each used to control a communication of particular user station 10, 20, 30 via bus line 3 with another user station of user stations 10, 20, 30, which are connected to bus line 3.

Communication control unit 11 may be designed like a conventional CAN controller. Communication control unit 11 creates and reads first messages 4, for example CAN or CAN FD messages 4. CAN messages 4 are constructed according to the CAN format or the CAN FD format, in which a number of up to 64 data bytes may be encompassed in message 4, as shown in the upper part of FIG. 2.

Communication control unit 21 in FIG. 1 may be designed like a conventional CAN FD controller except for the differences described in more detail hereinafter. Communication control unit 21 creates and reads second messages 5, which are, for example, modified CAN FD messages. In this case, the modified CAN FD messages are constructed on the basis of an CAN FX format, in which a number of greater than 64 bytes and in particular up to, for example, 1096 data bytes may be encompassed in message 5. This is shown very schematically in the lower part of FIG. 2 for a frame having few data bytes.

Communication control unit 31 may be designed to provide a message 4 or a CAN FX message 5 for transceiver unit 32 or to receive the message from it as needed. Communication control unit 21 thus creates and reads a first message 4 or second message 5, first and second message 4, 5 differing due to their data transmission standard, namely in this case CAN or CAN FD or CAN FX.

Transceiver unit 12 may be designed like a conventional CAN and/or CAN FD transceiver. Transceiver unit 22 may be designed like a conventional CAN FD transceiver except for the differences for CAN FX described in more detail hereinafter. Transceiver unit 32 may be designed to provide messages 4 according to the present CAN format using CAN FD or messages 5 according to the CAN FX format for communication control unit 31 or to receive messages from it as needed.

Using the two user stations 20, 30 a formation and then transmission of messages 5 may be implemented using the CAN FX format and thus at higher data rates than CAN FD.

Figure 2:
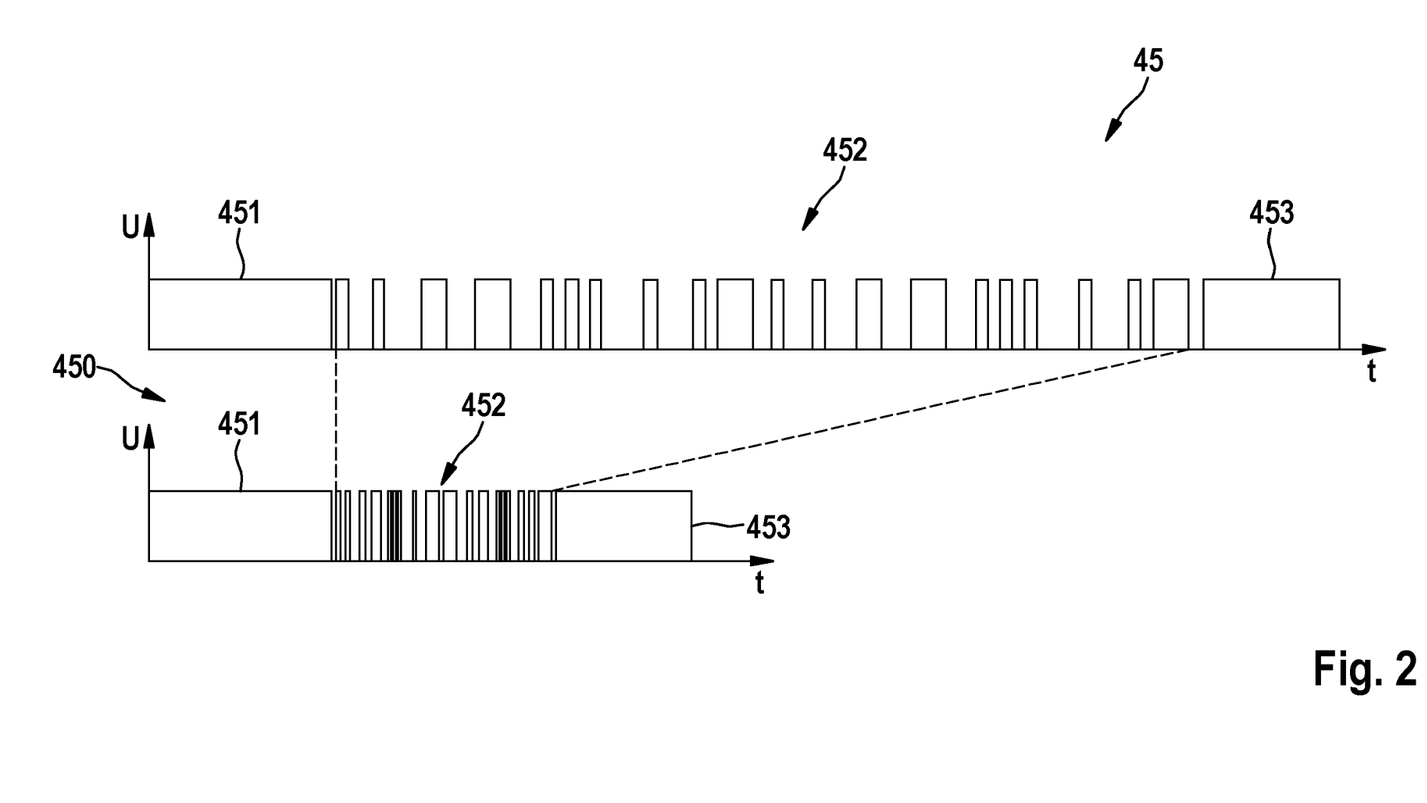
FIG. 2 shows a diagram to illustrate the structure of messages which may be transmitted by user stations of the bus system according to the first exemplary embodiment of the present invention.

FIG. 2 shows in its top part, for message 4, a CAN FD frame 45, as is transmitted by transceiver unit 12 or transceiver unit 13, and in its bottom part, for message 5, a special example of a CAN FX frame 450, as may be transmitted by transceiver unit 22 or 32. Alternatively, the top part of FIG. 4 may be interpreted as a classical CAN frame and the bottom part of FIG. 2 may be interpreted as a CAN FD frame or CAN FX frame.

CAN FD frame 45 and CAN FX frame 450 are, like the classical CAN frame, fundamentally divided into two different phases or ranges for the CAN communication on bus 40, namely arbitration phases 451, 453, which are identical in principle, and a data range, which may also be called data field in classical CAN or data phase 452 in CAN FD. The useful data are contained in data phase 452 in the CAN FD frame or message 4. Moreover, the useful data are contained in data phase 452 in the CAN FX frame or message 5, which are transmitted at least at significantly higher bit rate on bus line 3 and thus the bus, however.

According to FIG. 2, in the case of CAN FD in comparison to classical CAN, the bit rate for following data phase 452 is increased to, for example, 2, 4, 8 Mbps at the end of arbitration phase 451. Therefore, in the case of CAN FD, the bit rate in arbitration phases 451, 453 is less than the bit rate in data phase 452. In the case of CAN FD, data phase 452 is significantly shortened in time in relation to data phase 452 of the CAN frame.

In the case of CAN FX, in comparison to CAN FD, at the end of arbitration phase 451, the bit rate for following data phase 452 is increased to, for example, 10 Mbps or 20 Mbps or another arbitrary value higher than in the case of CAN FD. Therefore, both in CAN FD and also CAN FX, the bit rate in arbitration phases 451, 453 is less than the bit rate in data phase 452. In the case of CAN FD, data phase 452 is significantly shortened in time in relation to data phase 452 of the CAN frame. In special applications, the two bit rates may be configured to equal values, but typically the bit rate is significantly higher in data phase 452 than in arbitration phases 451, 453.

For CAN FX, a frame format is defined, in which not only the bit rates within the frame or message 5 are switched, but optionally also the operating mode of transceiver unit 22, 32. In arbitration phases 451, 453, transceiver unit 22, 32 operates in an operating mode (called CAN here), which is compatible with ISO 11898-2:2016. In data phase 452, transceiver unit 22, 32 may optionally be switched into another operating mode, which makes higher bit rates and thus fast data transmission possible and is called PP mode (PP=push-pull) here, in which both bus levels of the various bus states are driven at equal strengths. The other operating mode of transceiver unit 22, 32 in data phase 452 may be designed differently than mentioned above. When switching the operating mode, it is necessary to avoid interferences on bus line 3 caused thereby.

The switchings of the bit rate and operating mode take place within two static bit patterns, thus without variable bits. The first bit pattern is called ADP (arbitration data pattern) hereinafter. The second bit pattern is called DAP (data arbitration pattern) hereinafter. In this case, the fixed bit pattern is selected in such a way that the bit pattern for switching into the lower or slower bit rate differs from all other bit patterns in a valid frame 45, 450.

Figure 3:
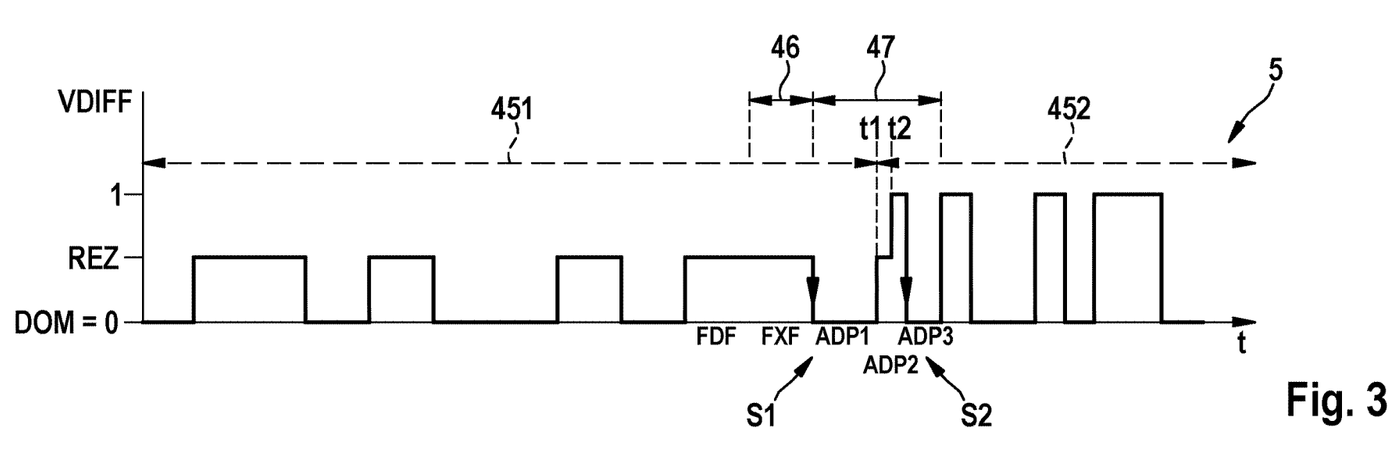
FIG. 3 shows an illustration of an example of a time curve of a differential voltage VDIFF of bus signals CAN_H and CAN_L for a first part of a message in a transceiver unit of the bus system according to the first exemplary embodiment of the present invention.

FIG. 3 shows the transition between arbitration phase 451 and data phase 452 for message 5 on the basis of differential voltage VDIFF for differential signals CAN_H and CAN_L over time t more accurately. Of course, the bit pattern is also usable in a message 4 and thus a frame 45.

As shown in FIG. 3, at the transition between phases 451, 452, switching takes place between first bit rate to second bit rate using the first predetermined bit pattern, bit pattern ADP. Predetermined bit pattern ADP is provided having bit sequences 46, 47 between arbitration phase 451 and data phase 452.

According to FIG. 3, a slower bit rate is used in arbitration phase 451 than in data phase 452. The bit rate of arbitration phase 451 is referred to hereinafter as the first bit rate. The bit rate of data phase 452 is also referred to hereinafter as the second bit rate. The level of logical "0" is dominant in arbitration phase 451 and may overwrite recessive level Rez, using which logical "1" is transmitted.

In synchronization bit pattern 46, 47 of FIG. 3, there is a first synchronization edge S1 at the end of bit 46, which is equal to the FXF bit in the case of CAN FX, immediately prior to the bit rate switch at a switching time t1. Immediately after the switch, a second synchronization edge S2 occurs in bit sequence 47.

As shown in FIG. 3, prior to second synchronization edge S2, not only the bit rate, but rather at a switching time t2 also the bus level is switched from level Rez for recessive to a level 1. The level switching is used, for example, to enable more symmetrical bit lengths at the higher bit rate than are possible in the case of dominant and recessive bus states. The switching of the bus level may take place as needed in a way other than that specified in the CAN protocol.

Communication control unit 11 expects according to the CAN FD protocol that a dominant bit follows a recessive FDF bit, which is transmitted immediately prior to bit 46. If communication control unit 11 instead detects a recessive bit, communication control unit 11 goes into a protocol exception state ("protocol exception"), which is defined in the CAN FD protocol.

Communication control units 21, 31 therefore create and interpret a CAN FX frame 450 in such a way that a recessive FXF bit also follows a recessive FDF bit, to switch to the frame format of a CAN FX frame 450. Therefore, the frame format of a CAN FX frame 450 appears like a CAN FD frame 45 except for the FDF bit.

Therefore, the ADP bit pattern, which switches to data phase 452 or effectuates switching to the bit rate and the level of data phase 452, begins with a recessive bit 46, called FXF here. Associated transceiver unit 22, 32 is still in the CAN mode at this point in time. In contrast, in data phase 452, after a switch possibly carried out at time t2 to the PP mode, depending on its design, there are no longer recessive and dominant bits. Therefore, the bit values in FIG. 3 are indicated as "0" and "1".

As in CAN FD, it is also necessary for a CAN FX frame 450 that prior to the switching of the bit rate, a synchronization takes place, because a transceiver unit 22, 32 which has only lost the arbitration in the last bit is not yet synchronized to the winner of the arbitration. Synchronization takes place at edges from "1" to "0", as in the CAN protocol. A synchronization to both edges, thus to the edge from "0" to "1" and to the edge from "1" to "0" would have the disadvantage of phase jumps, because the two edges are typically of different speeds.

Therefore, according to FIG. 3, a "0" bit, called ADP1 here, comes in a CAN FX frame 450 after the FXF bit. The bit after ADP1, called ADP2 here, is then already part of data phase 452. To enable further synchronization directly after the bit rate switch, bit ADP2 is a "1" bit and is followed by a "0" bit, which is called ADP3 here.

Therefore, in a CAN FX frame 450 for a message 5, the recessive FXF bit after the recessive FDF bit causes a switch to the CAN FX frame format.

In synchronization bit pattern 46, 47, there are first synchronization edge S1, namely from bit FXF to bit ADP1 prior to the bit rate switch, and second synchronization edge S2, namely from bit ADP2 to bit ADP3. The synchronization is particularly robust if all user stations 20, 30, after the switching of the bit rate, accept the first edge from "1" to "0" as the beginning of the ADP3 bit, even if the "1" level prior to the edge does not have the expected length of 1 data phase bit time or 1 bit time of a bit in data phase 452. In this way, deviations are compensated for which result due to quantization errors during the sampling of the bus level, switching procedures, and propagation times in the signal path.

Synchronization bit pattern 46, 47 is particularly helpful if in addition to the bit rate, the operating mode of transceiver unit 22, 32 is also switched, thus if different bus levels are used for the transmission of the higher bit rate, as described above. Interferences on bus line 3, which could be generated by the switching of transceiver unit 22, 32, are avoided in that transceiver unit 22, 32 is switched at a suitable position within bit pattern 46, 47. In the example of FIG. 3, for example, the operating mode of transceiver unit 22, 32 is switched in bit ADP2 at time t2 from the CAN mode into the PP mode. The switching time is selected so that even a slight shift of the edge from ADP1 ("0") to ADP2 ("1") does not result in an incorrect synchronization of user stations 20, 30.

In the present exemplary embodiment, the length of bit ADP2 is dependent on how fast the operating mode may be switched in transceiver unit 22, 32. That means, the operating mode is switched in a timely manner prior to the end of bit ADP2, so that second synchronization edge S2 is not disturbed.

In FIG. 3, bit ADP2 is as long as a bit of data phase 452. Bit ADP2 could instead have the length of a bit of arbitration phase 451, however. There would therefore be sufficient time for the switching of the operating mode in transceiver unit 22, 32. Moreover, the switching would be independent of the set bit rate in data phase 452, which varies according to the application from 1 Mbps to, for example, 15 Mbps. In this case, the phase having the higher bit rate, thus data phase 452 in FIG. 3, would first begin with bit ADP3.

Alternatively, however, bit ADP2 has an arbitrary other length, for example the length of two data phase bit times.

If an operating mode other than the PP mode is used in data phase 452, switching time t2 for the operating mode may alternatively be selected in another way within the ADP pattern.

Edges possibly arise on the bus during the switching of the operating mode in transceiver unit 22, 32 which may not be used for the synchronization. To avoid the synchronization on these interfering edges, the synchronization may optionally be prohibited in the first part of the bit, in which the switching of the operating mode takes place and which is bit ADP2 in the example of FIG. 3. For example, in such a case, no user station 20, 30 may carry out a synchronization in the first 80% of bit ADP2.

Figure 4:
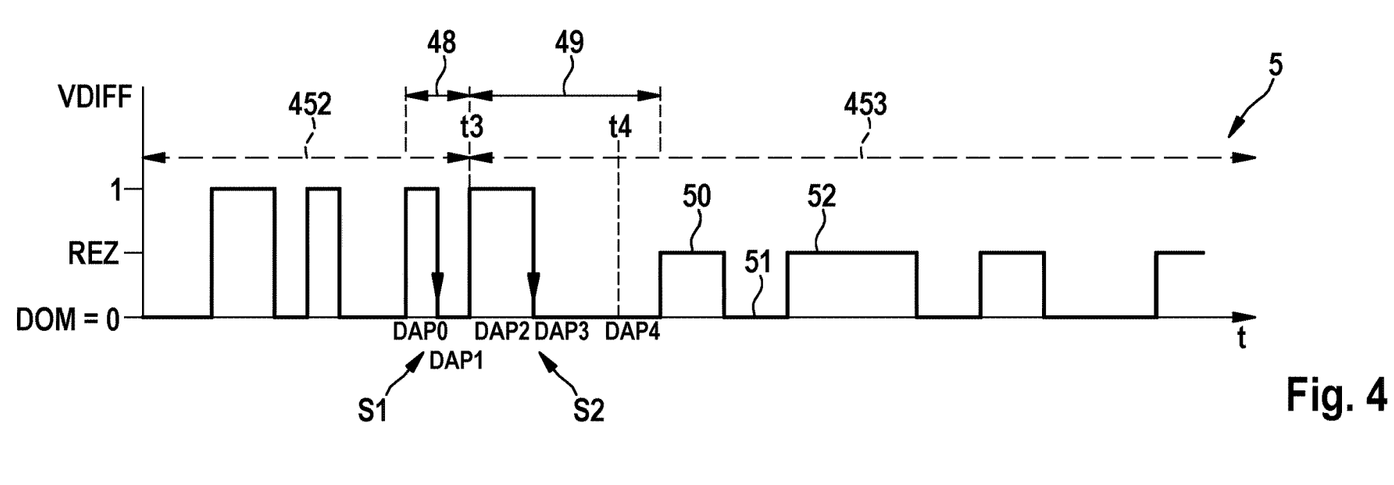
FIG. 4 shows an illustration of an example of a time curve of a differential voltage VDIFF of bus signals CAN_H and CAN_L for a second part of the message of FIG. 3.

FIG. 4 shows the transition between data phase 452 and arbitration phase 453 for message 5. Differential voltage VDIFF for differential signals CAN_H and CAN_L is also again shown here over time t for a part of message 5, in which switching of the bit rate takes place, as already described above in reference to FIG. 3.

In contrast to predetermined bit pattern ADP including bit sequences 46 and 47 of FIG. 3, second bit pattern DAP including predetermined bit sequences 48, 49 and bits DAP0 through DAP4 is provided between data phase 452 and arbitration phase 453. After the at least two directly successive dominant bits at the end of bit pattern DAP, thus bits DAP3 and DAP4, a recessive bit 50 delimits the bit pattern from a possibly following dominant ACK bit 51, as shown in FIG. 4. Recessive bit 50 may also be referred to as the DAP delimiter. Bit 50 is not required for synchronization, but has the function in the CAN FX frame format for the receiver of message 5 of checking a reintegration into the communication for plausibility after a detected error. If the receiver sees an edge within bit 50 or during an ACK delimiter bit 52, the receiver concludes therefrom that the DAP bit pattern was probably not seen. Therefore, the receiver again searches for second bit pattern DAP, since it is not actually reintegrated.

ACK bit 51 is provided so that receivers of message 5 may confirm, for example, using a recessive bit, the correct reception of message 5 (acknowledgment). If the reception is not correct in this example, ACK bit 51 is not driven and therefore remains dominant, as transmitted by the sender of message 5.

The precise number of the at least two directly successive dominant bits (DAP3, DAP4) is dependent on the bit rate ratio or the factor between the first and second bit rate and on the stuffing mechanism in data phase 452. If the factor is lower or the stuffing permits more than 10 identical bits, more than two dominant bits are required to achieve the uniqueness of the DAP bit pattern in a valid frame 450 or a valid message 5.

Bit sequence 48 includes, in the synchronization bit pattern, first synchronization edge S1 from bit DAP0 to a bit DAP1 prior to the bit rate switching at a time t3. In bit sequence 49, second synchronization edge S2 from bit DAP2 to bit DAP3 is provided. The synchronization is particularly robust if all user stations 20, 30, after the switching of the bit rate, accept first edge S1 from "1" to "0" as the beginning of bit DAP3, even if the "1" level prior to edge S1 does not have the expected length of 1 bit time of arbitration phase 453. In this way, deviations are compensated for which result due to quantization errors during the sampling of the bus level, switching procedures, and propagation times in the signal path.

In the example of FIG. 4, in addition to the bit rate, the operating mode of transceiver unit 22, 32 is also switched. In this example, the operating mode of transceiver unit 22, 32 is switched in bit DAP4 at a time t4 from the PP mode to the CAN mode. In this case, switching takes place during a "0" bit from the PP mode to the CAN mode, because the level of "0" is equal to the level of dominant. Alternatively, the operating mode of transceiver unit 22, 32 may therefore already have been switched in bit DAP1 and therefore prior to time t3 of the bit rate switching. If an operating mode other than the PP mode is used in data phase 452, the switching time within the DAP pattern may be selected differently.

To further increase the synchronization and robustness, the switching of the operating mode of transceiver unit 22, 32 may already take place prior to edge S2. Therefore, edge S2 is already transmitted in the matching new operating mode. In this case, the switching of the operating mode of transceiver unit 22, 32 could take place in bit DAP1 or bit DAP2. The optimal position is dependent on the design of the operating mode of transceiver unit 22, 32 in data phase 452.

In principle, one of synchronization edges S1, S2 is sufficient in the DAP pattern, because user stations 10, 20, 30 are synchronized relatively well to the transmitting user station, the transmitting node. Therefore, according to a modification of the present exemplary embodiment, the DAP pattern may be made up only of bits DAP0, DAP3, and DAP4. In such a case, switching of the operating mode of transceiver unit 22, 32 after single edge S1 or S2 would be advantageous, thus, for example, in bit DAP3, which is in bit pattern DAP after edge S2 and therefore certainly after single edge S1, S2. Switching therefore also takes place here within a dominant ("0") bit. Alternatively, switching of the operating mode of transceiver unit 22, 32 is only possible in bit DAP4.

Alternatively, the DAP pattern may only include bits DAP2, DAP3, and DAP4.

Otherwise, the same statements apply as described above in conjunction with FIG. 3.

The synchronizations in the ADP pattern and in the DAP pattern are preferably all hard synchronizations.

Overall, a very high clock tolerance for bus system 1 may be achieved using the above-described exemplary embodiment.

According to a second exemplary embodiment, communication control units 21, 31 are designed to use the DAP pattern for a reintegration into the communication after frame 450 could not be successfully decoded.

Such a case may exist if communication control units 21, 31 have seen a stuffing error or because the check of a header checksum (header CRC check) was not successful, for example. It is also possible that a receiver of message 5 detects an error in message 5 or frame 450, because transceiver unit 22, 32 cannot recognize the data length code (DLC).

If communication control units 21, 31 fail in the decoding of the frame, affected communication control units 21, 31 lose the reference to the sender of frame 450. Affected communication control units 21, 31 therefore may no longer detect when data phase 452 of frame 450 or when frame 450 itself comes to an end. In such a case, affected communication control units 21, 31 also cannot detect the start of following frame 450. Affected communication control unit 21, 31 has lost the thread and has to reintegrate into the communication.

To reintegrate such user stations 20, 30 or their communication control units 21, 31, the DAP pattern contains a bit sequence 48, 49, which may not occur in data phase 452. The DAP pattern has dominant bits DAP3, DAP4, which are sufficiently long or have such bit time durations that are longer than the longest sequence of identical bits in data phase 452. User stations 20, 30 may thus detect the end of frame 450.

To provide sufficient flanks S1, S2 for the synchronization of user stations 20, 30, the bits in data phase 452 are coded so that the number of the successive identical bits is limited. This is carried out, for example, by a bit stuffing mechanism, which ensures that no more than, for example, 10 identical bits may follow one another.

If the factor between the bit rates is 20, for example, 10 data phase bits are as long as one half arbitration phase bit. The two dominant bits DAP3 and DAP4, taken together, thus unambiguously differ from all bit sequences which may occur in data phase 452. User stations 20, 30 or their communication control units 21, 31 which have lost the reference to the sender of frame 450 may detect this bit sequence 48, 49 and reintegrate themselves in frame 450. Of course, they may not receive frame 450, but they may detect the end of frame 450, more precisely the switching procedure back into arbitration phase 451, 453, and thus optionally also output an error identifier (error flag) or error frame 47.

In the case of other factors between the bit rates or other bit stuffing mechanisms, the sequence of dominant bits is lengthened, for example by DAP4 through DAPn. The length of this bit sequence is not fixed in the protocol format. Instead, the length is configured in user stations 20, 30 or their communication control units 21, 31 matching with the configured bit rates. The net data rate is thus increased in that the overhead is limited to the minimum.

It may occur that one of user stations 20, 30 or their communication control units 21, 31 which searches for the DAP pattern to integrate itself again spuriously finds the DAP pattern because of a bit error within data phase 452 of presently transmitted frame 450.

In this case, this user station 20, 30 or their communication control units 21, 31 will highly probably find edges in frame bits after the DAP pattern where they are unexpected, namely, for example, in the ACK delimiter bit or the end of frame bits. In this case, this user station 20, 30 or their communication control units 21, 31 have to start the reintegration again, thus search for the DAP pattern again.

If the spuriously found DAP pattern and the actual DAP pattern are very close to one another with respect to time, it may occur that this user station 20, 30 or their communication control units 21, 31 may no longer find the actual DAP pattern.

For this reason, this user station 20, 30 or their communication control units 21, 31 have to search in parallel for two patterns during the reintegration:
  for the DAP pattern
  and for 11 successive recessive arbitration phase bits which mark the end of a frame 45, 450. The 11 recessive bits correspond to the integration condition in the CAN standard ISO 11898-1:2015. After the 11 recessive bits, a new frame 45 may be transmitted on the bus or on bus line 3. This has the result that this user station 20, 30 or their communication control units 21, 31 may no longer output error identification 47, because this would interfere with the transmission of next frame 45, 450.

In parallel to searching for the DAP, a user station 20, 30 which has to reintegrate itself thus also always searches for the "bus idle condition," as is also available in the classical CAN protocol: If user station 20, 30 has seen eleven successive recessive (long) bits in a frame 450, user station 20, 30 may assume that the bus is idle and a new frame 450 may start. Since CAN FX is compatible with CAN FD, this "bus idle condition" also applies.

In the classical CAN, the 11 recessive bids are the ACK delimiter (bit 50)+7 bits at the frame end (EOF=end-of-frame)+3 bits intermediate frame interval (intermission). These bits are between dominant bits ACK and start-of-frame.

If a user station 20, 30 or their communication control units 21, 31 which wish to reintegrate see this "bus idle condition," they may start a frame 450 immediately thereafter. Alternatively, user station 20, 30 or their communication control units 21, 31 may accept the next seen dominant bit as the start of a new Rx frame, so that user station 20, 30 is only the receiver of message 5.

User station 20, 30 or their communication control units 21, 31 behave as a function of which pattern or patterns this user station 20, 30 or their communication control units 21, 31 find. If the DAP bit pattern is found, the reintegration takes place at the DAP position in frame 450 and an error identification 47 is sent later in frame 450. If only the 11 successive recessive arbitration phase bits are found, the reintegration takes place at the end of the frame and an error identification 47 is not transmitted. Until then, communication control units 21, 31 remain in the error state.

Depending on detected bit pattern, user station 20, 30 reintegrates itself at the DAP position within frame 450 or at the end of frame 450. User station 20, 30 may, depending on the embodiment of bus system 1, then also transmit a non-acknowledgement signal at the end of frame 450, which is also called NACK. If user station 20, 30 attempts to reintegrate itself too early, for example, because it has spuriously seen the long dominant level of the DAP bit pattern in data phase 452 due to a further error, user station 20, 30 checks the reintegration for plausibility in that user station 20, 30 watches out for following edges. If user station 20, 30 sees unexpected edges which do not match with the DAP pattern including following ACK bit 51 and NACK bit, user station 20, 30 aborts the reintegration and searches for the DAP bit pattern once again.

All above-described embodiments of bus system 1, user stations 10, 20, 30, and the method carried out thereby may be used individually or in all possible combinations. In particular, all features of the above-described exemplary embodiments and/or their modifications may be combined as desired. Additionally or alternatively, in particular the following modifications are conceivable.

Above-described bus system 1 according to the exemplary embodiments is described on the basis of a bus system based on the CAN protocol. Bus system 1 according to the exemplary embodiments may also be another type of communication network, however. It is advantageous, but not a necessary requirement, that an exclusive, collision-free access of a user station 10, 20, 30 to a shared channel is ensured in bus system 1 at least for certain time spans.

The number and arrangement of user stations 10, 20, 30 in bus system 1 of the exemplary embodiments is arbitrary. In particular, user station 10 in bus system 1 may be omitted. It is possible that one or multiple of user stations 20 or 30 are present in bus system 1.

What is claimed is:

1. A user station for a bus system, comprising:
a communication control unit to create a message for at least one further user station of the bus system, in which an exclusive, collision-free access of a user station to a bus line of the bus system is ensured at least temporarily;
wherein the communication control unit is configured to provide, in the message, a first phase, which is to be transmitted at a first bit rate, and a second phase, which is to be transmitted at a second bit rate which is faster than the first bit rate,
wherein the communication control unit is configured to provide, in the message, a first predetermined bit pattern for a bit rate switching between the first bit rate and the second bit rate and to provide a second predetermined bit pattern for a bit rate switching between the second bit rate and the first bit rate, the second predetermined pattern differing from all other bit patterns in a valid message, and
wherein the switchings of the bit rate and an operating mode take place within two static bit patterns, without variable bits, wherein the first bit pattern is an arbitration data pattern (ADP), and wherein a second bit pattern is a data arbitration pattern (DAP), wherein the fixed bit pattern is selected so that the bit pattern for switching into the lower or slower bit rate differs from all other bit patterns in a valid frame.

2. The user station as recited in claim 1, wherein the second predetermined bit pattern includes at least two directly successive dominant bits of an arbitration phase as the first phase, and the at least two directly successive dominant bits, taken together, differing unambiguously from all bit sequences which may occur in a data phase as the second phase.

3. The user station as recited in claim 1, wherein the first predetermined bit pattern includes an edge for synchronization both prior to and also after the bit rate switching, using which the at least one further user station as a receiver may synchronize with the user station as a sender.

4. The user station as recited in claim 1, wherein the second predetermined bit pattern includes an edge for synchronization at least after the bit rate switching and prior to the operating mode switching, using which the at least one further user station as a receiver may synchronize with the user station as a sender.

5. The user station as recited in claim 1, wherein the communication control unit is configured to provide a time for an operating mode switching in the first predetermined bit pattern and the second predetermined bit pattern, the time for the operating mode switching in the first predetermined bit pattern is after the time for the bit rate switching and prior to an edge for synchronization, which is provided after the bit rate switching for synchronization.

6. The user station as recited in claim 5, wherein edges for synchronization are edges from recessive to dominant.

7. The user station as recited in claim 1, wherein the communication control unit is configured, after detection of an error, to search in the message for the second predetermined bit pattern and a third predetermined bit pattern which indicates the end of the message, and the communication control unit is configured to reintegrate itself in a communication in the bus system when the communication control unit has detected the second predetermined bit pattern or the third predetermined bit pattern.

8. The user station as recited in claim 1, wherein the message is a CAN FD message message, in which the first predetermined bit pattern contains a switching of the first bit rate after an arbitration phase to the faster second bit rate in a data phase, in which useful data of the message are included, and in which the second predetermined bit pattern includes a switching of the second bit rate after an acknowledgment to the slower first bit rate for the arbitration phase.

9. The user station as recited in claim 8, wherein the first predetermined bit pattern includes a bit of a CAN FD message as a recessive bit, at which a first synchronization edge is provided.

10. The user station as recited in claim 1, further comprising:
a transceiver unit configured for synchronization to at least one synchronization edge in the first predetermined bit pattern and second predetermined bit pattern of the message at an end or beginning of an arbitration phase.

11. The user station as recited in claim 10, wherein the transceiver unit is configured to switch its operating mode using the first predetermined bit pattern and the second predetermined bit pattern to transmit data at the second bit rate using a different bus level on the bus line than data at the first bit rate.

12. A bus system, comprising:
a bus line; and
at least two user stations which are connected to one another via the bus line in such a way that they may serially communicate with one another; wherein at least one of the at least two user stations is a user station including:
a communication control unit to create a message for at least one further user station of the bus system, in which an exclusive, collision-free access of a user station to a bus line of the bus system is ensured at least temporarily,
wherein the communication control unit is configured to provide, in the message, a first phase, which is to be transmitted at a first bit rate, and a second phase, which is to be transmitted at a second bit rate which is faster than the first bit rate,
wherein the communication control unit is configured to provide, in the message, a first predetermined bit pattern for a bit rate switching between the first bit rate and the second bit rate and to provide a second predetermined bit pattern for a bit rate switching between the second bit rate and the first bit rate, the second predetermined pattern differing from all other bit patterns in a valid message, and
wherein the switchings of the bit rate and an operating mode take place within two static bit patterns, without variable bits, wherein the first bit pattern is an arbitration data pattern (ADP), and wherein a second bit pattern is a data arbitration pattern (DAP), wherein the fixed bit pattern is selected so that the bit pattern for switching into the lower or slower bit rate differs from all other bit patterns in a valid frame.

13. A method for transmitting a message at different bit rates in a bus system, the method comprising:
creating, using a communication control unit of a user station of the bus system, a message for at least one further user station of the bus system, in which an exclusive, collision-free access of a user station to a bus line of the bus system is ensured at least temporarily;
wherein the communication control unit provides, in the message, a first phase, which is to be transmitted at a first bit rate, and a second phase, which is to be transmitted at a second bit rate which is faster than the first bit rate, wherein the communication control unit provides in the message a first predetermined bit pattern for a bit rate switching between the first bit rate and the second bit rate and providing a second predetermined bit pattern for a bit rate switch between the second bit rate and the first bit rate, the second predetermined pattern differing from all other bit patterns in a valid message, and wherein the switchings of the bit rate and an operating mode take place within two static bit patterns, without variable bits, wherein the first bit pattern is an arbitration data pattern (ADP), and wherein a second bit pattern is a data arbitration pattern (DAP), wherein the fixed bit pattern is selected so that the bit pattern for switching into the lower or slower bit rate differs from all other bit patterns in a valid frame.

* * * * *